(12) United States Patent
Downs et al.

(10) Patent No.: US 10,586,439 B2
(45) Date of Patent: Mar. 10, 2020

(54) SYSTEMS AND METHODS TO CONTROL LIGHT FIXTURE OPERATION USING GAS CONCENTRATION SENSORS

(71) Applicant: ABL IP Holding LLC, Atlanta, GA (US)

(72) Inventors: Steven E. Downs, Lilburn, GA (US); Yenpao Lu, Cumming, GA (US)

(73) Assignee: ABL IP Holding LLC, Atlanta, GA (US)

( * ) Notice: Subject to any disclaimer, the term of this patent is extended or adjusted under 35 U.S.C. 154(b) by 2 days.

(21) Appl. No.: 15/972,722

(22) Filed: May 7, 2018

(65) Prior Publication Data

US 2019/0340913 A1    Nov. 7, 2019

(51) Int. Cl.
*G08B 21/14*        (2006.01)
*G08B 21/18*        (2006.01)
*H02J 9/06*         (2006.01)

(52) U.S. Cl.
CPC .......... *G08B 21/14* (2013.01); *G08B 21/182* (2013.01); *H02J 9/06* (2013.01)

(58) Field of Classification Search
CPC .......... G08B 21/14; G08B 21/182; H02J 9/06
See application file for complete search history.

(56) References Cited

U.S. PATENT DOCUMENTS

| 7,273,983 | B1* | 9/2007 | Rintz | F21S 8/035 |
| | | | | 174/66 |
| 8,723,427 | B2 | 5/2014 | Collins et al. | |
| 2015/0061500 | A1 | 3/2015 | Yeh | |
| 2018/0018866 | A1* | 1/2018 | Carlin | G08B 29/043 |
| 2018/0058709 | A1* | 3/2018 | Kagawa | F24F 7/013 |
| 2018/0299153 | A1* | 10/2018 | Ajax | G05B 15/02 |
| 2018/0370430 | A1* | 12/2018 | Gage, III | G08B 21/14 |

OTHER PUBLICATIONS

CA 3,004,073, "Office Action," dated May 3, 2019, 5 pages.

* cited by examiner

*Primary Examiner* — James J Yang
*Assistant Examiner* — Kevin Lau
(74) *Attorney, Agent, or Firm* — Kilpatrick Townsend & Stockton LLP (57) ABSTRACT

Certain examples involve lighting systems controlled based on gas concentration data received by a controller. For instance, a lighting system includes a first light fixture to illuminate a first space. The lighting system also includes at least one gas concentration sensor associated with the first space, and a first controller that receives gas concentration data from the at least one gas concentration sensor. The first controller also overrides the illumination state of the first light fixture based on the gas concentration data received from the at least one gas concentration sensor by controlling the first light fixture in an alert state that is different from the illumination state.

18 Claims, 5 Drawing Sheets

SYSTEMS AND METHODS TO CONTROL LIGHT FIXTURE OPERATION USING GAS CONCENTRATION SENSORS

TECHNICAL FIELD

This disclosure relates generally to the field of controlling operation of light fixtures. More particularly, this disclosure relates to controlling the operation of the light fixtures based on gas concentration measurements in an area illuminated by the light fixtures.

BACKGROUND

Concentrations of volatile organic compounds, carbon monoxide, and other gases within closed areas may have an impact on occupants of the closed areas. Traditionally, a gas concentration detector detects gas concentrations in a vicinity of the gas concentration detector and provides an audible alert from within a housing of the gas concentration detector intended to alert occupants of a heightened concentration of gas. Because any alerts associated with the gas concentration detector are limited to sounds originating from the gas concentration detector, the occupants of the closed area may not be capable of hearing the alert when the occupants are positioned remotely from the gas concentration detector, or in the event that walls or other objects are positioned between the occupants and the gas concentration detector.

The ability to alert occupants of significant gas concentrations in multiple ways finds use in residential and commercial building designs. It is desirable to have a gas concentration detector capable of reliably alerting all occupants within a building or within a closed area of the building of a high gas concentration. Existing systems may provide occupants with only an audible alert. However, characteristics of certain buildings and closed areas may make such a system unreliable in reaching every occupant within the buildings or closed areas.

SUMMARY

Aspects and examples are disclosed for apparatuses and processes for alerting occupants of gas concentrations using a lighting system. For instance, a lighting system may include a first light fixture that functions in an illumination state to illuminate a first space. The lighting system may also include at least one gas concentration sensor associated with the first space and a first controller that receives gas concentration data from the at least one gas concentration sensor. In operation, the first controller may override the illumination state of the first light fixture based on the gas concentration data received from the at least one gas concentration sensor by controlling the first light fixture in an alert state that is different from the illumination state.

In another example, a controller may include a processing device and a non-transitory computer-readable medium communicatively coupled to the processing device. The processing device may execute program code stored in the non-transitory computer-readable medium and perform operations including receiving a sensor reading from at least one gas concentration sensor associated with a first light fixture. The operations performed by the processing device may also include determining whether the sensor reading indicates that a gas concentration near the gas concentration sensor exceeds a gas concentration threshold, and determining whether the sensor reading indicates that a rate of change of the gas concentration near the gas concentration sensor exceeds a rate of change threshold. Further, upon determining that the gas concentration or the rate of change of the gas concentration exceeds the gas concentration threshold or the rate of change threshold, the operations performed by the processing device may include overriding an illumination state of the first light fixture to control the first light fixture in an alert state. Controlling the first light fixture in an alert state may involve outputting a first visual indication that the gas concentration or the rate of change of the gas concentration exceeds the gas concentration threshold or the rate of change threshold.

In another example, a method for controlling a lighting system include includes one or more processing devices performing operations may include receiving a sensor reading from at least one gas concentration sensor associated with a first light fixture. The operations may also include determining that the sensor reading indicates that a gas concentration near the gas concentration sensor exceeds a gas concentration threshold. Further, the operations may include overriding an illumination state of the first light fixture to control the first light fixture in an alert state to output a first visual indication that the gas concentration exceeds the gas concentration threshold.

These illustrative examples are mentioned not to limit or define the disclosure, but to provide examples to aid understanding thereof. Additional examples are discussed in the Detailed Description, and further description is provided there.

BRIEF DESCRIPTION OF THE DRAWINGS

Features, examples, and advantages of the present disclosure are better understood when the following Detailed Description is read with reference to the accompanying drawings.

DETAILED DESCRIPTION

Light fixture operations of a lighting environment may be controlled based on sensed environmental conditions by a gas concentration sensor. For example, a light fixture in the lighting environment may provide visual indications to occupants within an illuminated area that one or more gas concentration sensors located in the illuminated area or near the illuminated area have sensed a condition that warrants an alert. Further, multiple gas concentration sensors may be present within the illuminated area such that a complete representation of the gas concentrations within the illuminated area is established. For example, the multiple gas concentration sensors may be located at different elevations to accurately detect concentrations of gases that may have different weights.

To provide a visual alert, a color and/or intensity of light output by the light fixture may be controlled to a different color or intensity when the gas concentration sensor detects the increased gas concentrations. A network interface controller, or other smart hub, may receive the gas concentration indication from the gas concentration sensor and provide a driver of the light fixture with instructions to change the output of the light fixture. The resulting change to the output of the light fixture (e.g., a change from a white color light to a red color light) alerts the occupants of the lighting environment to the alert condition detected by the gas concentration sensor.

Figure 1:
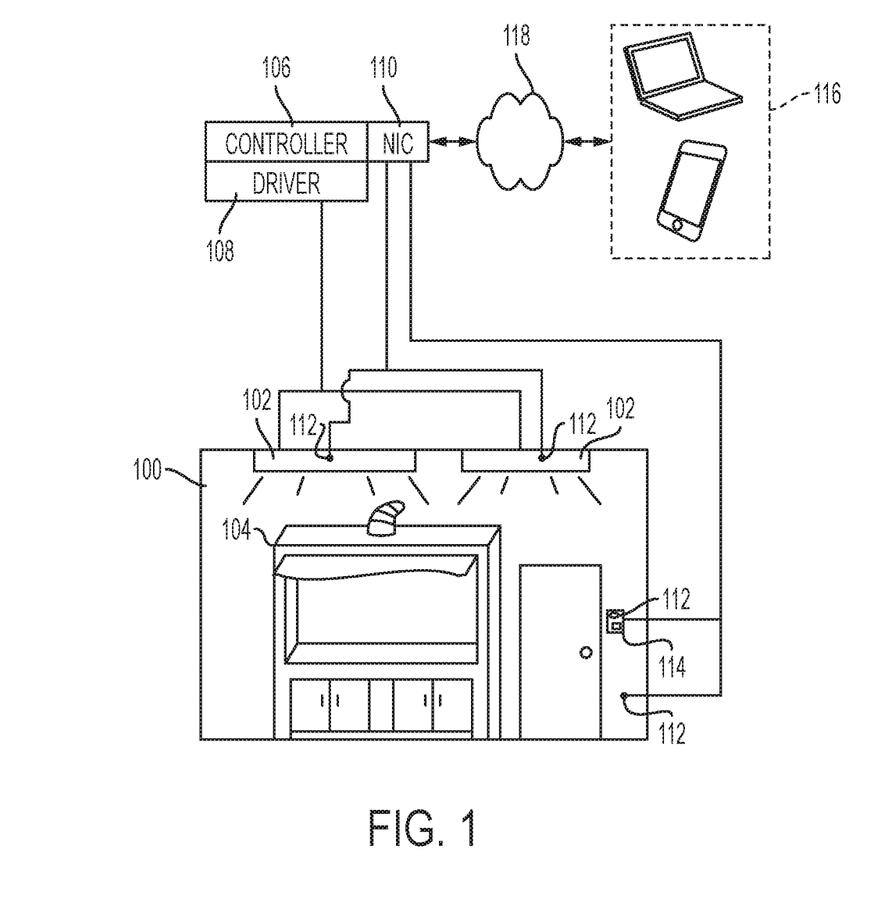
FIG. 1 depicts an exemplary lighting environment, according to certain examples of the present disclosure.

With reference to FIG. 1, shown is an exemplary lighting environment 100. The lighting environment 100 includes various lighting fixtures 102 that illuminate objects in the lighting environment 100, such as a fume hood 104 when the lighting environment 100 is a laboratory, for example. The light fixture 102 may include an lighting element, a controller 106, a driver 108, a network interface controller 110, and other possible components. The lighting element of the light fixture 102 may be a light-emitting diode (LED), a fluorescent lamp, an incandescent lamp, other light emitting device(s), or any combination thereof.

The controller 106 may be used to control the light output from the lighting elements of the light fixtures 102, where control of the light output may be determined using one or more inputs to the controller 106. The controller 106 for a given light fixture 102 may be a hard-wired component of the light fixture 102, may be attached to a standard receptacle on the light fixture 102, or may be located remotely from the light fixture 102 (e.g., in a networked lighting system control room of a building).

In an example, the network interface controller 110 and the controller 106 provide the ability for a user or a networked lighting system to intelligently control operation of the light fixtures 102. The network interface controller 110 may receive input data from gas concentration sensors 112 located within the lighting environment 100, and provide the input data to the controller 106. Based on the input data, the controller 106 may generate instructions that control the driver 108. The driver 108, based on the instructions received from the controller 106, regulates power supplied to the light fixtures 102 to generate a light output into the lighting environment 100.

The controller 106, the driver 108, and the network interface controller 110, in an example, may be replaced or augmented by a smart driver that is equipped to intelligently control operation of the light fixtures 102. In one or more examples, the controller 106, the driver 108 and the network interface controller 110 may be housed within a single housing. In an additional example, the controller 106, the driver 108, and the network interface controller 110 may be positioned in locations remote from one another.

The gas concentration sensors 112 sense gas concentrations within the lighting environment 100. As illustrated, the gas concentration sensors 112 are located within the light fixtures 102 and within a light switch housing 114. The sensors are also contemplated in other locations throughout the lighting environment 100. Because of the relative weights of some gases that may be present in the lighting environment 100, the gas concentration sensors 112 may be placed at different height zones within the lighting environment 100 such that the buildup of a heavier gas (e.g., propane) does not go unnoticed as it collects in a lower portion of the lighting environment 100. The gas concentration sensors 112 provide an indication of gas concentrations to the controller 106, and the controller 106 modifies the light output of the light fixtures 102 based on the gas concentrations within the lighting environment 100. For example, the controller 106 may be programmed to change a color profile of the light fixtures 102 (e.g., a light color) when a detected gas concentration exceeds a gas concentration threshold (e.g., indicating a fume leak from the fume hood 104). Additionally, the controller 106 may control the driver 108 to modify the light output of the light fixtures 102 based on a programmed dimming schedule and/or input from one or more other sensors, such as an occupancy sensor, temperature sensor, ambient light sensor, etc. The light fixtures 102 providing such light output may be referred to as the light fixtures 102 operating in an illumination state.

The network interface controller 110 may also receive input from a remote device 116 (e.g., a laptop computer or a mobile phone) via a wireless network interface (e.g., a Bluetooth® Low-Energy (BLE) network interface). After establishing a communication session over a network 118 between the remote device 116 and the network interface controller 110, the remote device 116 may send commands to modify the programming or other configuration of the controller 106 for the light fixtures 102. In some implementations, the communication session may be "point-to-point," such as a direct communication session between the remote device 116 and the network interface controller 110, without the use of intermediate network devices (e.g., network routers, switches, etc.).

While FIG. 1 depicts a lighting environment 100 representative of a laboratory, the controller 106, the driver 108, the network interface controller 110, and the light fixtures 102 may be positioned in other types of lighting environments. For example, the lighting environment 100 may be a residential location, a manufacturing facility, a horticultural facility, or any other facility that may use the controller 106, the driver 108, the network interface controller 110, and the light fixtures 102.

Figure 2:
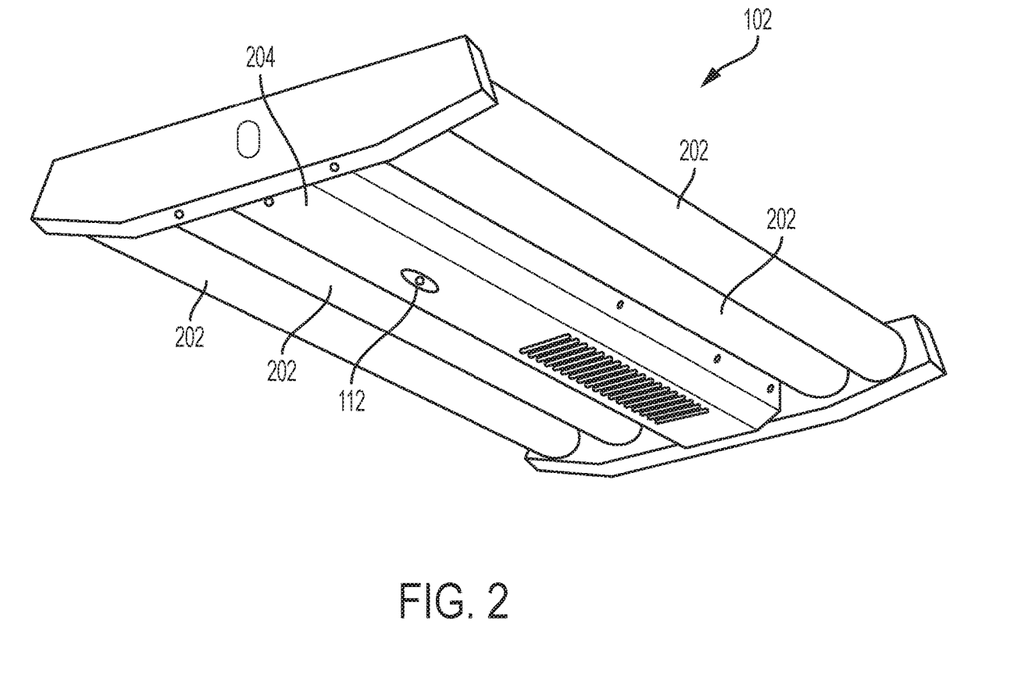
FIG. 2 depicts a perspective view of an exemplary light fixture including a gas concentration sensor, according to certain examples of the present disclosure.

FIG. 2 is a perspective view of an example of the light fixture 102 of FIG. 1 including the gas concentration sensor 112. The light fixture 102 includes lighting elements 202. The lighting elements 202 may be light-emitting diodes (LED), fluorescent lamps, incandescent lamps, other light emitting devices, or any combination thereof. The lighting elements 202 are driven by the driver 108 based on instructions received from the controller 106 to output light into the lighting environment 100.

The gas concentration sensor 112 is positioned on a central beam 204 of the light fixture 102. In an example, the gas concentration sensor 112 may be shaped to replace existing sensors in the central beam 204 of the light fixture 102. For example, the gas concentration sensor 112 may be similar in size to a removable occupancy sensor or a removable lighting sensor of the light fixture 102. Because of the similar size, the gas concentration sensor 112 may be positioned within a similarly sized removable fixture that is capable of attaching to the light fixture 102. For example, the gas concentration sensor 112, and any other sensors that are capable of coupling to the light fixture 102, may be modular such that any sensor is capable of plugging into the same ports. Further, while only the individual gas concentration sensor 112 is depicted as part of the light fixture 102, any number of sensors are positionable within the light fixture 102. For example, a light sensor may be positioned and functioning within the light fixture 102 at the same time that the gas concentration sensor 112 is positioned and functioning in the light fixture 102. In some cases, sensors are capable of coupling to the light fixture 102 via other sensors.

For example, a first sensor (e.g., the gas concentration sensor 112) may be coupled to the light fixture 102 via a second sensor (e.g., the light sensor), such as via a pass-through connection present in the second sensor.

In an example, the gas concentration sensors 112 may also be positioned around an area that is illuminated by the light fixture 102 to account for different weights of gases that may be present within the illuminated area. For example, a lighter gas may be observed in greater concentrations by the gas concentration sensor 112 positioned in the light fixture 102 than by the gas concentration sensor 112 positioned in or near the light switch housing 114, as depicted in FIG. 1. Accordingly, to provide more accuracy to gas concentration detection by the gas concentration sensors 112, the gas concentration sensors 112 may be positioned at varying heights throughout the illuminated area to provide a complete picture of the gas concentrations within the area.

Figure 3:
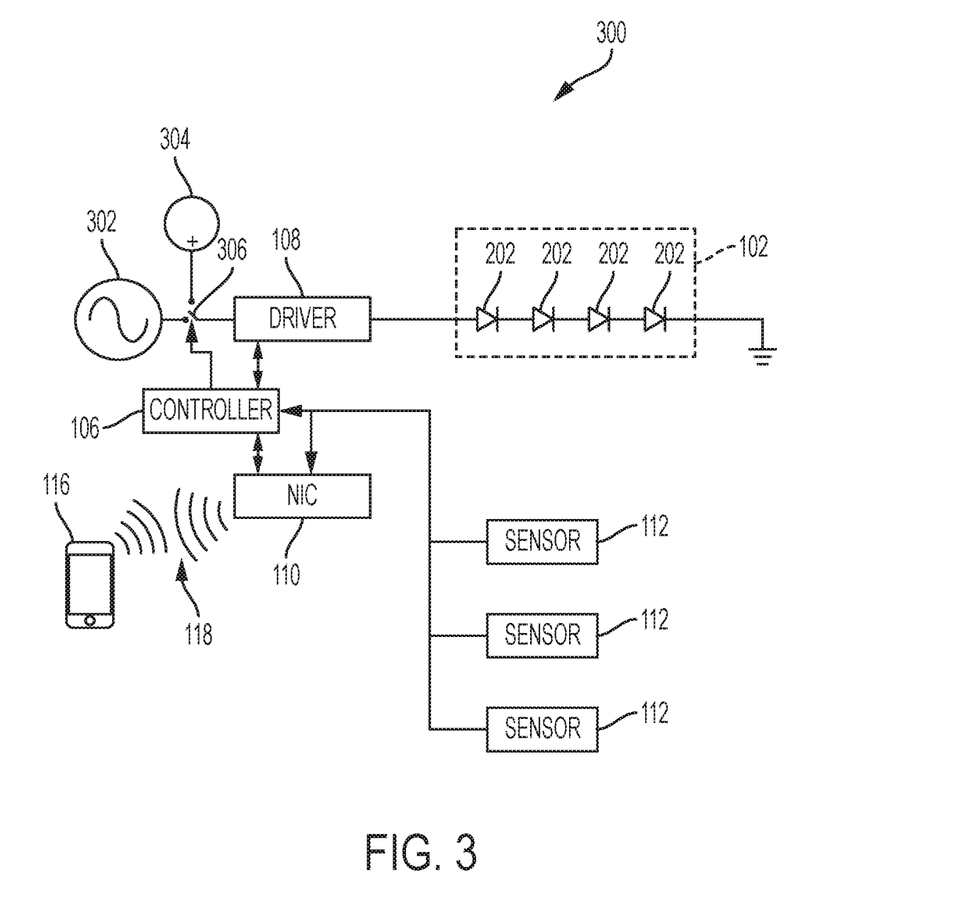
FIG. 3 depicts a schematic representation of an exemplary lighting system, according to certain examples of the present disclosure.

FIG. 3 is a schematic representation of an exemplary lighting system 300. As illustrated, the exemplary lighting system 300 includes the controller 106, the driver 108, and the network interface controller 110 (i.e., a smart hub). In an example, the controller 106, the driver 108, and the network interface controller 110 may be replaced by a smart driver, which includes the ability to communicate with the remote device 116 and also to intelligently control operation and output of the light fixture 102 based on information received from the gas concentration sensors 112 and the remote device 116. The network interface controller 110, or a smart component capable of replacing the network interface controller 110, may communicatively couple to a wireless or wired network 118, and the network interface controller 110 provides instructions received from the network 118 to the controller 106 to control to the driver 108. In an example, the controller 106 may be a smart hub and may include capabilities to communicate across the network 118 independent of the network interface controller 110. That is, the controller 106 may include a network I/O port or a wireless transceiver that is able to communicate across the network 118 directly without the use of the network interface controller 110. In another example, the network interface controller 110 may be a smart hub and may include capabilities to control the driver 108 absent the controller 110. To accomplish network communication and to provide instructions that control the driver 108, the network interface controller 110 may include a processor and a non-transitory computer-readable medium that stores instructions that are executed by the processor.

In the illustrated example, the network interface controller 110 receives instructions over the network 118 and provides the instructions to the controller 106. The controller 106 controls the driver 108 based on the received instructions. In such an example, the controller 106 and the network interface controller 110 may be packaged with the driver 108 (e.g., within a common housing), or the controller 106 and the network interface controller 110 may be positioned in remote locations from the driver 108 (e.g., not within a common housing). In another example, the controller 106 may be remote from a common housing that includes both the driver 108 and the network interface controller 110. That is, the controller 106 may be located in a networked lighting system control room of a building, or the controller 106 may be located in a neighboring or nearby lighting fixture 102. Other housing arrangements are also contemplated with the controller 106, the driver 108, and the network interface controller 110. The network interface controller 110 may operate as a smart hub to communicate between the remote device 116, the driver 108, or any other components using Bluetooth® (including BLE), WiFi®, LEDcode, nLight®, or other suitable communication protocols, or any combination thereof.

The driver 108 may receive power from an AC power source 302 (e.g., from the electrical grid), and the driver 108 regulates the power provided to the light fixture 102. The controller 106 may provide instructions to the driver 108 that control the light fixture 102 to change color characteristics and intensity of the light output by the lighting elements 202. While the lighting elements 202 are depicted in a serial arrangement, the light fixture 102 may include the lighting elements 202 in any combination and/or configuration. Additionally, the driver 108 may provide power to other components of the light fixture 102 than the lighting elements 202. For example, the driver 108 may provide power to the gas concentration sensors 112 or other sensors associated with the light fixture 102, and the driver 108 may also provide power to the controller 106 and the network interface controller 110.

In an example, a backup battery power source 302 may provide backup power to the lighting system 300 to compensate for outages of the AC power source 302. Outages of the AC power source 302 may include power outages of a building that houses the light fixture 102. In an additional example, the controller 106 may control a switch 306 to block provision of power from the AC power source 302 to the lighting system 300 when a flammable gas is detected by the gas concentration sensors 112. In such an example, the battery power source 304 provides the backup power to the light fixture 102 after the switch 306 is moved to from the AC power source 302 to the battery power source 304. While the switch 306 is depicted as a selection switch, other switches or combinations of switches are also contemplated to control application of the power sources 302 and 304 to the lighting system 300. In an example where the lighting system 300 forms a portion of a networked lighting system of a building or complex of buildings, switching to the battery power source 304 may provide an indication to the networked lighting system of a location of the light fixture 102 that is located in a high gas concentration environment. This indication may be used by building maintenance, a fire department, or any other groups to locate, isolate, and resolve the gas concentration issue.

In an additional example, the battery power source 304 may provide backup power to the lighting system 300 when the AC power source 302 is out in the building that houses the lighting system 300. In such an example, the switch 306 may move to the battery power source 304 when power is no longer provided by the AC power source 302. In this manner, the controller 106 may continue to control the light fixture 102 based on data received from the gas concentration sensors 112.

While the gas concentration sensors 112 are depicted as providing data directly to both the controller 106 and the network interface controller 110, the controller 106 and the network interface controller 110 may receive data from the gas concentration sensors 112 in other configurations. For example, the controller 106 and the network interface controller 110 may receive data over the network 118 from the gas concentration sensors 112. Other light fixtures 102 that include or are associated with the gas concentration sensors 112 may deliver the data to the controller 106 and the network interface controller 110 across the network 118. Additionally, the gas concentration sensors 112 may connect to a centralized server using a wireless network connection, and the centralized server may provide the data from the gas concentration sensors 112 to the controller 106 and the network interface controller 110 over the network 118.

Figure 4:
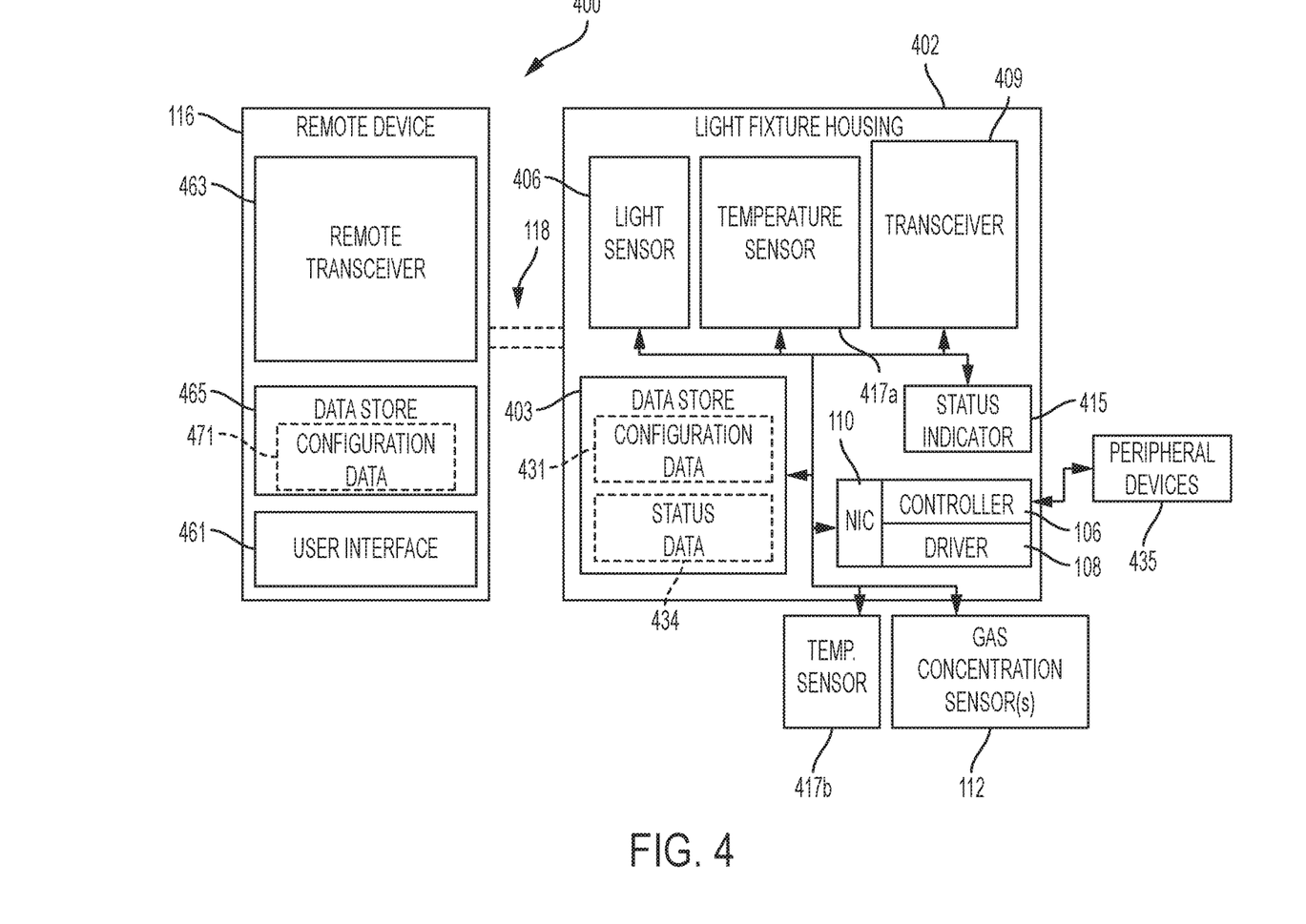
FIG. 4 depicts a schematic representation of an exemplary remote communication scenario in the lighting environment of FIG. 1, according to certain examples of the present disclosure.

With reference to FIG. 4, shown is schematic representation of an exemplary remote communication scenario 400 that may occur in the lighting environment 100 according to various examples. This remote communication scenario 400 includes a light fixture housing 402 and the remote device 116, which are in data communication with each other via the network 118. The network 118 includes wireless networks such as may be defined by Bluetooth® (including BLE), Wi-Fi®, the IEEE 802.15 standards family, other possible technology standards and protocols, or any combination thereof.

The light fixture housing 402 includes the controller 106 to control the light output from one or more associated light fixtures. Alternatively, the light fixture housing 402 can represent a plurality of such devices which may be in communication with the remote device 116. Various functionality may be executed in the light fixture housing 402 according to various examples. Also, various data is stored in a data store 403 that is accessible to components of the light fixture housing 402. The data store 403 may be representative of a plurality of data stores 403. The data stored in the data store 403, for example, is associated with the operation of the various functional entities described below.

The components included in the light fixture housing 402, for example, include the controller 106, the driver 108, the network interface controller 110, a light sensor 406, a transceiver 409, and a status indicator 415. Additionally, the light fixture 402 may include a temperature sensor 417a and/or other components. The components of the light fixture 402 may also be in communication with components external to the light fixture 402, such as a temperature sensor 417b, the gas concentration sensor(s) 112, and/or other possible components. The components of the light fixture housing 402 may communicate using a data bus or other possible protocols. The light sensor 406 reports the amount of ambient light that it detects, which the controller 106 may use as an input or factor for determining a level of light output (also referred to as "brightness") from the associated light fixture. The transceiver 409 facilitates establishing the network 118, through which commands can be received for the controller 106, with a remote device 116. Some of these received commands may be instructions for modifying the configuration data 431 that the controller 106 uses for determining and acting on a level of gas concentrations detected in the lighting environment, as well as other possible purposes.

The controller 106 determines the actions to undertake related to light output from the light fixture based on inputs received from a programmed schedule, the various sensors, and/or the transceiver 409. For example, based on inputs received from the gas concentration sensor 112, the controller 106 may determine that light output from a light fixture 102 should be controlled to a different color characteristic to provide a visual indication of a change in gas concentrations in an area. The controller 106 may be commissioned via programming and parameters that can be stored in the data store 403 within the light fixture housing 402.

The status indicator 415 may be made up of one or more components that provide an indication of the status of various functions of the controller 106. For example, the status indicator 415 may include a status light, a speaker capable of producing an audible indication, an electronic notification (e.g., a text message, an alert to a building security system), and/or other possible indication mechanisms. In some implementations, the lighting element of the light fixture may also be used as part of the status indicator 415. For example, the lighting element of a light fixture may flash when a communication session is being attempted with the controller 106 managing the light fixture. As another example, the status indicator may be an LED light that is red when the controller 106 is not communicating with a remote device 116, and is green if a communication session with a remote device 116 is established.

The gas concentration sensor 112 detects gas concentrations at locations surrounding the gas concentration sensor 112. In an example, the gas concentration sensor 112 is positioned on the light fixture 102. The gas concentration sensor 112 is also capable of being positioned in other locations in a lighting environment serviced by a light fixture controlled by the controller 106. In operation, the gas concentration sensor 112 is able to detect various concentrations of gases making up an environment of a room. For example, the gas concentration sensor 112 can detect carbon monoxide levels or volatile organic compound levels. When high concentrations of carbon monoxide and/or volatile organic compounds are detected by the gas concentration sensor 112, the controller 106 controls the light output of the light fixture 102 to change colors. For example, the color characteristic of the light output may change from a white color to a red color indicating that the concentrations of certain gases have increased beyond a predetermined threshold. In one example, the controller 106 may control the light fixtures 102 to flash on and off as an additional layer of alert.

The controller 106 may also provide an indication to peripheral devices 435 that are able to perform mitigation operations. The mitigation operations may include venting operations in the area experiencing high gas concentrations, sending alert emails to personnel associated with the area, providing audible alerts over speakers located in the area, other suitable mitigation operations, or any combination thereof. Further, when a set of light fixtures 102 are networked in a lighting grid, such as in a commercial building environment, the output of the light fixtures 102 that are near the area with the heightened gas concentration may also be controlled by the controller 106 to change colors even though the gas concentration sensors 112 associated with those light fixtures 102 do not indicate a gas concentration exceeding the predetermined threshold. For example, the light fixtures 102 nearest the high gas concentration may output red light, while the light fixtures 102 positioned further away from the high gas concentration gradually fade toward white light. That is, the light fixtures 102 may output light that transitions from red light, to orange light, to yellow light, to white light as the light fixtures 102 are positioned further from detected the high gas concentrations. Such a color gradient may aid in alerting an occupant to the most efficient exit from the building experiencing the high gas concentrations.

In an example, the gas concentration sensors 112 may also provide information to predict a carbon dioxide concentration in an area near the gas concentration sensors 112. Because carbon dioxide concentrations are difficult to measure directly, and because volatile organic compound concentrations correlate with carbon dioxide concentrations, the network interface controller 110, or other processing device associated with the controller 106, may generate a prediction of carbon dioxide concentrations. The carbon dioxide concentration prediction may provide the controller 106 with an accurate representation of a number of occupants (i.e., an estimated occupancy number) in a space surrounding the gas concentration sensors 112. The controller 106 may use the occupant information to control the light fixtures 102 such that, among other possible functions, the controller 106 can manage the intensity level and the color temperature of the light output based upon the occupancy. Some components employed by the controller 106, such as the various sensors, may be remotely located from the controller 106.

The data stored in the data store 403 includes, for example, configuration data 431, status data 434, and potentially other data. The configuration data 431 can include the current programming and/or parameters used to configure components of the controller 106, such as the driver 108 and the network interface controller 110; one or more stored configurations (i.e. "profiles") usable for programming the controller 106; one or more identifiers for the controller 106 and/or light fixture 102; credentials used to authenticate a remote device 116; and/or other possible data. The status data 434 includes a record of the state of various components and activities of the controller 106. For example, the status data 434 may include data indicating that the current state of a light of a light fixture is "ON" and dimmed to 70% of the maximum brightness as a result of action by the controller 106 based on input from the light sensor 406 and a schedule using the time of day. The data stored in the status data 434 may be stored and read by the various components of the light fixture housing 402. In some examples, the status data 434 may keep all or a portion of the historical data stored in the status data 434, such as the past actions initiated by the controller 106, for diagnostic or other purposes. While the components are described above as being within the light fixture housing 402, other examples may include the components located in other areas outside of the light fixture housing 402. For example, while each of the components may be associated with the light fixture 102, the components may be located in various physical housings located outside of the light fixture housing 402.

The remote device 116 is representative of the types of remote devices that may be used to communicate with the components of the light fixture housing 402 via the network 118. The remote device 116 may include, for example, a computer system, such as a smartphone, tablet computer, or other devices with like capability. The remote device 116 may also include a user interface 461, remote transceiver 463, an additional data store 465, and other possible components. The user interface 461 may comprise, for example, one or more devices such as tactile buttons and/or a display such as a liquid crystal display (LCD), LED display, organic light emitting diode (OLED) display, or other types of display devices. In some implementations, the display may be touch-sensitive. The user interface 461 can provide an indication of the status of various functions of the remote device 116 and components of the light fixture housing 402. For example, the user interface 461 may include a display that overlays onto a map or building schematic of each of the light fixture housings 402 detected within radio range of the remote device 116.

The data store 465 includes, for example, configuration data 471 and potentially other data associated with the operation of the remote device 116. The configuration data 471 can include one or more stored profiles usable for the programming controllers 106, various data (model numbers, customer names, light fixture wattage, communication history, location, etc.) corresponding to identifiers for the controllers 106 and/or light fixtures 102, credentials used to authenticate with controllers 106, and/or other possible data.

The remote transceiver 463 provides a wireless network interface to facilitate establishing the network 118 using a communication link with the components of the light fixture housing 402. A user of the remote device 116 may provide input to the user interface 461 requesting to discover any nearby controllers 106. Upon receiving the input, the remote device 116 begins identifying any controllers 106 within range of the remote transceiver 463. The identification process may be carried out according to the one or more protocols supported by the remote transceiver 463, such as Bluetooth, Wi-Fi, etc. In some implementations, controllers 106 periodically transmit a respective identifier that may be received by any remote devices 116 within range. In other implementations, the remote device 116 may first transmit a message requesting any controllers 106 within range to transmit a respective identifier that may be received by the remote device 116. The identifier transmitted by each of the controllers 106 may be representative of one or more pieces of identifying information such as a serial number, a network address, a model number, a geographic coordinate for the location of the controllers 106, an assigned name or other identifier, and/or other types of identifying information for the respective controller 106 and associated light fixture 102. The user interface 461 may be used to indicate to the user that a search for any nearby controllers 106 is underway by, for example, displaying a message.

The user interface 461 of the remote user device 116 may enable commissioning of the controllers 106 by a user. When commissioning a controller 106, a user may select an identifier corresponding to an uncommissioned controller 106 for commissioning. During the commissioning, the user takes administrative control of the controller 106, which may include configuring one or more user credentials, configuring the programming for managing light output from a light fixture 102 associated with the controller 106, specifying the location (e.g., network location, physical location) of the controller 106, specifying physical attributes of a lighting area controlled by the controller 106, and/or other possible activities. For example, the user interface 461 may present a location adjustment indicator whereby the commissioning user can specify a more precise location on a map or a building schematic for the particular controller 106. Once the location is specified, it may be stored in the particular controller 106 and/or in the remote device 116.

If a marker used to identify a controller 106 is selected from the user interface 461, the remote device 116 may initiate a point-to-point communication session with the controller 106 by establishing the network 118. Once the communication session is established, the user interface 461 of the remote device 116 may be used to send commands to adjust the programming of the controller 106. In some implementations, after the communication session is established, the remote device 116 may retrieve the current configuration of the controller 106 and render the user interface of the remote device to reflect the current configuration state of the controller 106, which may then be adjusted by the user. The remote device 116 may send commands to change the configuration of the controller 106 that result in modifications to the light output or other behaviors of the light fixture 102. The commands may configure and/or override the logic of the gas concentration sensors 112, the light sensor 406, the temperature sensors 417a or 417b, or any combination thereof of the controller 106, whereby a given portion of the configuration may be effective during defined time periods or upon occurrence of particular events, such as upon detection of an occupant.

The individual configuration changes (e.g. enabling/disabling a feature) made by the user may be individually transmitted to the controller 106 as the configuration change is made, or one or more changes may be transmitted to the controller 106 as a batch periodically and/or as directed by the user. The controller 106 may provide a confirmation of configuration changes received from the remote device 116 by sending a confirmation message to the remote device 116 via the communication session, as well as providing a visual and/or audible confirmation at the light fixture 102 managed by the controller 106. Each controller 106 may locally store its respective configuration, while the remote device 116 may also retain copies of configurations of controllers with which it has been in communication.

In some implementations, the controller 106 may be commissioned to control operation of the light fixture 102 when the gas concentration sensors 112 detect gas concentrations that exceed predetermined concentration thresholds or concentration rate of change thresholds. The controller 106 may develop a steady state profile of gas concentrations over time. For example, the controller 106 may monitor gas concentrations provided over time by the gas concentrations sensors 112 to develop the steady state profile of gas concentrations. After developing the steady state profile of gas concentrations, tracking a rate of change of the gas concentrations may provide the controller 106 with an indication that the gas concentrations are trending toward undesirable levels. In an additional example, a user may provide the controller 106 with physical dimensions of a room that includes the gas concentration sensors 112 during commissioning of the controller 106. Using this information, the controller 106 is able to analyze when gas concentrations exceed predetermined thresholds for the room including the gas concentration sensors 112. As a result of gas concentrations exceeding the predetermined thresholds or the rates of change of the gas concentrations exceeding the developed profile of gas concentrations, the controller 106 may change the color characteristic of the lights to a color indicating that gas concentrations and/or rates of change of the gas concentrations exceed standard operating parameters. For example, the controller 106 may control the light fixtures 102 to output a red color light when the gas concentrations and/or the rates of change of the gas concentrations exceed the standard operating parameters.

Figure 5:
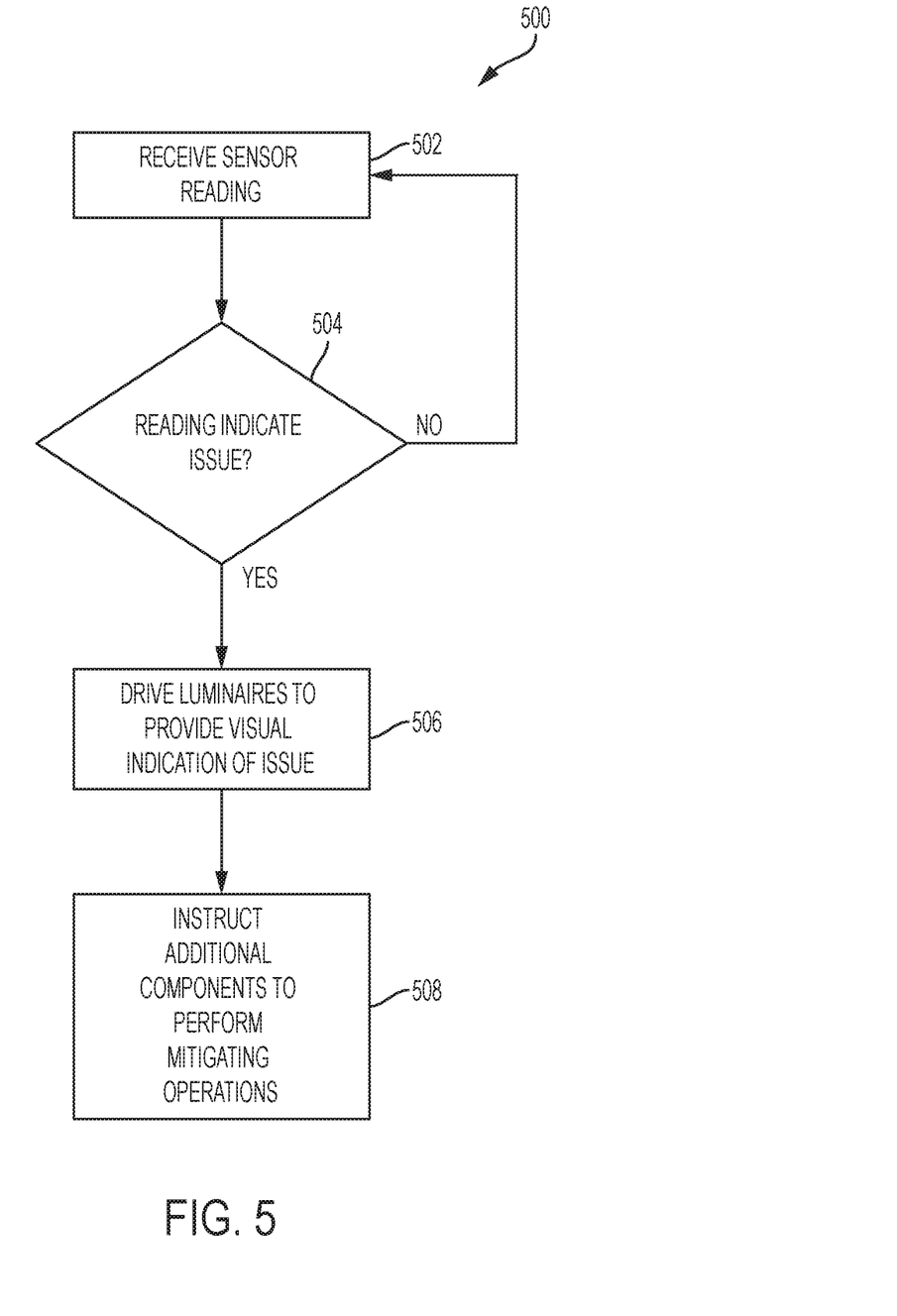
FIG. 5 depicts an exemplary process for controlling operation of a luminaire, according to certain examples of the present disclosure.

FIG. 5 depicts an exemplary process 500 for controlling operation of a luminaire, such as the light fixture 102. One or more processing devices implement operations depicted in FIG. 5 by executing suitable program code. For illustrative purposes, the process 500 is described with reference to certain examples depicted in the figures. Other implementations, however, are possible. In an example, the operations described in the process 500 may be performed upon completion of the commissioning of the controller 106, as discussed above with respect to FIG. 4.

At block 502, the process 500 involves receiving a sensor reading. For instance, the gas concentration sensors 112 provide electrical signals to the network interface controller 110, which operates as a smart hub. The electrical signals provided by the gas concentration sensors 112 are representative of gas concentrations within a lighting area illuminated by the light fixture 102. As discussed above, the gas concentration sensors may be positioned at multiple elevations within the lighting area to gain a complete picture of the gas concentration within an area by accounting for the differing weights of the gases measured by the gas concentration sensors 112. In some examples, receiving the sensor reading involves communicating, via a data bus, suitable signals between the gas concentration sensors 112 and a processing device of the network interface controller 110.

At block 504, the process 500 involves determining whether the sensor reading indicates an issue with the gas concentrations in the lighting area. For example, the controller 106, which includes the driver 108 and the network interface controller 110, may store in the data store 403 data that establishes threshold values for gas concentrations and rates of change of gas concentrations. If the sensor reading does not exceed the threshold values for any of the gas concentrations measured by the gas concentration sensors 112, then the process 500 returns to block 502 to receive a subsequent sensor reading from the gas concentration sensors 112.

If the sensor reading does exceed the threshold values for any of the gas concentrations measured by the gas concentration sensor 112, then the process 500, at block 506, involves driving the luminaires (e.g., the light fixtures 102) to an alert state that provides a visual indication of an issue (e.g., a gas concentration that exceeds a threshold value). In driving the luminaires in the alert state, the controller 106 overrides the illumination state of the luminaires established via scheduling or other data inputs that do not indicate an issue prompting the alert state override. The visual indication may be changing the color characteristic of the light output from a white light to a red light, or the visual indication may involve alternating the light output between a high intensity light output and a lower intensity light output. Additionally, the luminaries may output any other visual indicator that may indicate to an occupant of the lighting area that the gas concentration of the lighting area exceeds standard operating levels.

At block 508, the process 500 involves instructing additional components to perform mitigating activities. That is, the controller 106, or the lighting network as a whole, may communicate with the peripheral devices 435 that one or more gas concentrations are exceeding a threshold, and the controller 106 may instruct the peripheral devices 435 to perform mitigating activities. In an example, the mitigating activities may include activating venting fans, activating speakers providing an audible evacuation instruction, sending emails to employees who work in the building of the affected lighting area, changing the output of nearby lights to a caution state (e.g., yellow or orange color lighting), any other actions that alert occupants or potential occupants of the area, or any combination thereof.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more examples of the present subject matter. Any suitable programming, scripting, or other type of language or combinations of languages may be used to implement the teachings contained herein in software to be used in programming or configuring a computing device.

Examples of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific examples thereof, it will be appreciated that those skilled in the art, upon attaining an understanding of the foregoing, may readily produce alterations to, variations of, and equivalents to such examples. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A lighting system, comprising:
   a first light fixture configured to function in an illumination state to illuminate a first space;
   at least one gas concentration sensor associated with the first space;
   a first controller configured to receive gas concentration data from the at least one gas concentration sensor and to override the illumination state of the first light fixture based on the gas concentration data received from the at least one gas concentration sensor by controlling the first light fixture in an alert state that is different from the illumination state;
   a first power input configured to receive power from an electrical grid and to provide power to the first light fixture; and
   a backup power source configured to provide backup power to the first light fixture, wherein the first controller is configured to switch from using power received by the first power input to power the first light fixture to using the backup power source when the at least one gas concentration sensor detects a gas in the first space.

2. The lighting system of claim 1, wherein the at least one gas concentration sensor comprises a first gas concentration sensor positioned at a first elevation and a second gas concentration sensor positioned at a second elevation within the first space, wherein the first elevation is different from the second elevation.

3. The lighting system of claim 1, wherein the at least one gas concentration sensor is removably coupled to the first light fixture or positioned at a housing of a light switch associated with the first light fixture.

4. The lighting system of claim 1, wherein the at least one gas concentration sensor is configured to measure a concentration of volatile organic compounds in the first space, and the first controller is configured to determine an estimated occupancy number within the first space based the concentration of volatile organic compounds.

5. The lighting system of claim 1, wherein the at least one gas concentration sensor is configured to detect concentration levels of carbon monoxide and volatile organic compounds within the first space.

6. The lighting system of claim 1, comprising:
   a second light fixture configured to function in the illumination state to illuminate a second space; and
   a second controller configured to control operation of the second light fixture, wherein the second controller comprises a networked connection with the first controller.

7. The lighting system of claim 6, wherein the first controller is configured to control the first light fixture in the alert state to output a first light color when a gas concentration detected by the at least one gas concentration sensor exceeds a gas concentration threshold, and the second controller is configured to control the second light fixture to output a second light color that is different from the first light color when the gas concentration detected by the at least one gas concentration sensor exceeds the gas concentration threshold.

8. A controller, comprising:
   a processing device; and
   a non-transitory computer-readable medium communicatively coupled to the processing device, wherein the processing device is configured to execute program code stored in the non-transitory computer-readable medium and thereby perform operations comprising:
   receiving a sensor reading from at least one gas concentration sensor associated with a first light fixture;
   determining whether the sensor reading indicates that a gas concentration near the gas concentration sensor exceeds a gas concentration threshold;
   determining whether the sensor reading indicates that a rate of change of the gas concentration near the gas concentration sensor exceeds a rate of change threshold;
   upon determining that the gas concentration or the rate of change of the gas concentration exceeds the gas concentration threshold or the rate of change threshold, overriding an illumination state of the first light fixture to control the first light fixture in an alert state to output a first visual indication that the gas concentration or the rate of change of the gas concentration exceeds the gas concentration threshold or the rate of change thresholds;
   opening a switch to block application of electrical grid power to the first light fixture upon determining that the gas concentration or the rate of change of the gas concentration exceeds the gas concentration threshold or the rate of change threshold; and
   providing backup battery power to the first light fixture upon removing the grid power from the light fixture.

9. The controller of claim 8, wherein controlling the first light fixture to output the first visual indication comprises controlling the first light fixture to output a red light.

10. The controller of claim 8, wherein controlling the first light fixture to output the first visual indication comprises controlling the first light fixture to output light that alternates between a first intensity and a second intensity, wherein the first intensity is different from the second intensity.

11. The controller of claim 8, wherein the at least one gas concentration sensor is configured to measure concentrations of carbon monoxide and volatile organic compounds.

12. The controller of claim 8, wherein the at least one gas concentration sensor is removably coupled to the first light fixture.

13. A method for controlling a lighting system, wherein the method includes one or more processing devices performing operations comprising:
   receiving a sensor reading from at least one gas concentration sensor associated with a first light fixture;
   determining that the sensor reading indicates that a gas concentration near the gas concentration sensor exceeds a gas concentration threshold;
   overriding an illumination state of the first light fixture to control the first light fixture in an alert state to output a first visual indication that the gas concentration exceeds the gas concentration threshold;
   opening a switch to block application of electrical grid power to the first light fixture upon determining that the gas concentration exceeds the gas concentration threshold; and
   providing backup battery power to the first light fixture upon removing the grid power from the light fixture.

14. The method of claim 13, wherein the gas concentration sensor is configured to measure carbon monoxide concentration and volatile organic compound concentration in an area illuminated by the first light fixture.

15. The method of claim 13, wherein the at least one gas concentration sensor comprises a first gas concentration sensor positioned within the first light fixture and a second gas concentration positioned within a light switch housing of a light switch associated with the first light fixture.

16. The method of claim 13, comprising:
   controlling a venting fan to vent an area illuminated by the first light fixture in response to determining that the gas concentration exceeds the gas concentration threshold.

17. The method of claim 13, comprising:
   controlling a second light fixture adjacent to the first light fixture to output a second visual indication that is different from the first visual indication.

18. The method of claim 17, wherein controlling the first light fixture in the alert state to output the first visual indication comprises controlling the first light fixture to output a red light, and wherein controlling the second light fixture to output the second visual indication comprises controlling the second light fixture to output a yellow light.

* * * * *